(12) United States Patent
Yoshida

(10) Patent No.: US 6,498,330 B1
(45) Date of Patent: Dec. 24, 2002

(54) SPHERICAL ABERRATION DETECTOR AND OPTICAL PICKUP DEVICE

(75) Inventor: Shinya Yoshida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/456,414

(22) Filed: Dec. 8, 1999

(30) Foreign Application Priority Data

Dec. 8, 1998 (JP) .......................................... 10-349072

(51) Int. Cl.[7] .................... G02B 27/40; G02B 27/64; G02B 7/04
(52) U.S. Cl. ................................. 250/201.5; 369/112.1
(58) Field of Search ..................... 250/201.5; 369/112.1

(56) References Cited

U.S. PATENT DOCUMENTS

| | | | |
|---|---|---|---|
| 4,904,856 A | | 2/1990 | Nagahama et al. ...... 250/201.5 |
| 5,111,449 A | * | 5/1992 | Kurata et al. ............. 369/44.37 |
| 5,523,993 A | * | 6/1996 | Freeman ..................... 369/109 |
| RE35,332 E | * | 9/1996 | Nagahama et al. ...... 250/201.5 |
| 5,754,503 A | * | 5/1998 | Senba et al. ............. 369/44.23 |
| 6,130,872 A | * | 10/2000 | Sugiura et al. ............. 369/109 |
| 6,229,600 B1 | * | 5/2001 | Martynov ................... 356/123 |

FOREIGN PATENT DOCUMENTS

JP         A8212579         8/1996

\* cited by examiner

*Primary Examiner*—Stephone B. Allen
*Assistant Examiner*—Eric Spears
(74) *Attorney, Agent, or Firm*—Birch, Stewart, Kolasch & Birch, LLP

(57) ABSTRACT

In a light detecting device for detecting light beams passing through a light-gathering optical system, an aberration detector of the present invention includes photodetectors for forming a light-gathering spot of a first light beam passing near an optical axis, and photodetectors for forming a light-gathering spot of a second light beam passing outside the first light beam. In accordance with detection signals of the detectors, a spherical aberration of the light-gathering optical system can be detected. With this arrangement, a spherical aberration appearing on the light-gathering optical system is precisely detected and corrected in an appropriate manner, so that it is possible to suitably record and reproduce information in a magneto-optical disk.

26 Claims, 6 Drawing Sheets

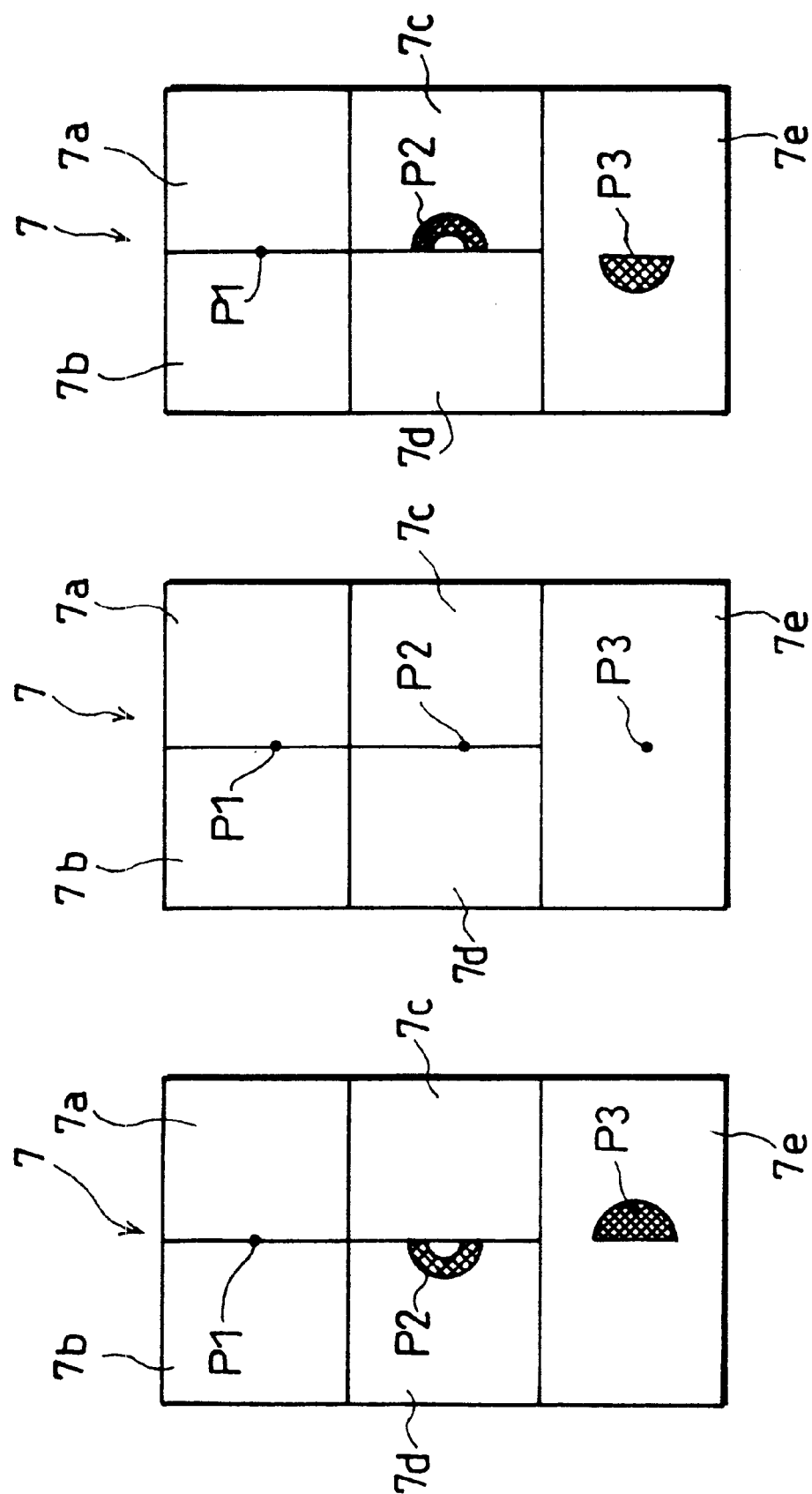

SPHERICAL ABERRATION DETECTOR AND OPTICAL PICKUP DEVICE

FIELD OF THE INVENTION

The present invention relates to an aberration detector which detects a spherical aberration appearing in a light-gathering optical system and further concerns an optical pickup device which is provided with the aberration detector.

BACKGROUND OF THE INVENTION

Generally, in order to increase a recording density in an optical disk device, it is necessary to minimize a wavelength of light used for recording and reproducing in an optical disk, which serves as a recording medium, or it is necessary to set a large numerical aperture (NA) for an object lens, which allows light to converge on the optical disk.

In order to reduce a wavelength of light, it is necessary to develop a semiconductor laser for generating a laser beam having a shorter wavelength. However, such a semiconductor laser cannot be readily developed, so that a method for increasing the numerical aperture of the object lens has been conventionally adopted to realize a higher recording density.

In order to increase the numerical aperture of the object lens, a method for increasing a diameter of the lens can be adopted. However, in this case, a large device is necessary and other problems occur. For this reason, a method has been advised, in which to apertures of the object lens are effectively increased by using a solid immersion lens without increasing a diameter of the objective lens.

For instance, Japanese Laid-Open Patent Application 8-212579/1996 (Tokukaihei 8-212579, published on Aug. 20, 1996) discloses an optical pickup device using the solid immersion lens. As shown in FIG. 6, in the optical pickup device, light gathered by an object lens 112 is transmitted through a substrate 111b of a magneto-optical disk 111 via a plate 113 and a solid immersion lens 114, the light is gathered on the an information recording layer 111a, and then, a magnetic head 115 records information. The magnetic head 115 is disposed such that the magneto-optical disk 111 is placed between the magnetic head 115 and the solid immersion lens 114.

The edge of the object lens 112 is held by a holder 118. The outer edge of the holder 118 is provided with a focusing actuator 119 for controlling a focus of the object lens 112, and a tracking actuator 120 for controlling tracking.

Meanwhile, the edge of the solid immersion lens 114 is held by a holder 116. The outer edge of the holder 116 is provided with a solid immersion lens actuator 117 for adjusting a space between the solid immersion lens 114 and the plate 113 or the object lens 112.

Here, the solid immersion lens 114 is made of glass having virtually the same refractive index as the substrate 111b of the magneto-optical disk 111, and a hemispheric surface is a spherical surface having a light-gathering point at the center. Thus, regarding light gathered by the object lens 112, the numerical aperture is multiplied by the refractive index in the substrate 111b. Specifically, when the numerical aperture is 0.55 in the objective lens 112 and the refractive index of the solid immersion lens 114 is 1.5, an effective numerical aperture is 0.83.

As described above, a light-gathering optical system using the solid immersion lens 114 has a large effective numerical aperture. However, a large spherical aberration appears due to a thickness error occurring in the substrate 111b of the magneto-optical disk 111 and due to a change in a thickness of the substrate 111b in the case of a multilayer structure.

Therefore, when a spherical aberration appears in the above light-gathering optical system including the solid immersion lens 114 and the object lens 112, the solid immersion lens actuator 117 is used for adjusting a space between the solid immersion lens 114 and the plate 113 or the object lens 112, so that the spherical aberration is corrected.

Specifically, the holder 116 and the holder 118 are respectively provided with electrodes which oppose each other, and electrical capacity is measured between the electrodes. At this time, the solid immersion actuator 117 shifts the holder 116 toward the holder 118 and maintains a space between the holders 116 and 118 such that the electrical capacity is at a predetermined value. Thus, the spherical aberration is artificially corrected in the light-gathering optical system.

Incidentally, in the above optical pickup device, a space between the holders 116 and 118 is maintained such that electrical capacity between the holders 116 and 118 is at a predetermined value. Hence, a spherical aberration is corrected in the light-gathering optical system.

Therefore, in the above optical pickup device, the electrical capacity is measured so as to detect the spherical aberration of the light-gathering optical system.

However, the electrical capacity measured between the holders 116 and 118 is an extremely small value of no more than 10 pF, so that an error may appear due to stray capacitances caused by wires and others in the optical pickup device. In this case, it is not possible to accurately detect a spherical aberration in the light-gathering optical system.

As mentioned above, when it is not possible to accurately detect a spherical aberration appearing in the light-gathering optical system, the appearing spherical aberration cannot be corrected in an appropriate manner. As a result, it is not possible to suitably record and reproduce information in the information recording layer 111a of the magneto-optical disk 111.

SUMMARY OF THE INVENTION

The object of the present invention is to provide an aberration detector which can accurately detect a spherical aberration appearing in the light-gathering optical system, without being affected by an ambient electrical noise, and to provide an optical pickup device which includes the aberration detector so as to suitably correct a spherical aberration appearing in a light-gathering optical system and which can suitably record and reproduce information in a magneto-optical disk.

In order to achieve the above object, the aberration detector of the present invention is provided with a detecting section for detecting a spherical aberration of the light-gathering optical system in accordance with two focus positions of a first light beam passing near an optical axis and a second light beam passing outside the first light beam, among light beams passing through the light-gathering optical system.

Therefore, the detecting section divides light beams passing through the light-gathering optical system into the first light beam passing near the optical axis and the second light beam passing outside the first light beam, and the detecting section detects a spherical aberration of the light-gathering optical system in accordance with the focus positions of the light beams. With this arrangement, it is possible to optically detect a spherical aberration appearing in the light-gathering optical system.

Hence, unlike a conventional device which electrically detects a spherical aberration appearing in the light-gathering optical system, a spherical aberration can be precisely detected without being affected by an ambient electrical noise.

As mentioned above, when a spherical aberration of the light-gathering optical system can be precisely detected, it is possible to correct the spherical aberration of the light-gathering optical system in an appropriate manner.

Further, the optical pickup device of the present invention is provided with a light source; a light-gathering optical system for gathering light, which is emitted from the light source, on a recording medium; a detecting section for detecting a spherical aberration of the light-gathering optical system in accordance with two focus positions of a first light beam passing near an optical axis and a second light beam passing outside the first light beam; and an aberration correcting section for correcting the spherical aberration of the light-gathering optical system in accordance with the output of the detecting section.

Thus, the detecting section divides light beams passing through the light-gathering optical system into the first light beam passing near the optical axis and the second light beam passing outside the first light beam, and the detecting section detects a spherical aberration of the light-gathering optical system in accordance with the focus position of the light beams; subsequently, the spherical aberration can be detected optically.

Therefore, unlike a conventional device which electrically detects a spherical aberration appearing in the light-gathering optical system, a spherical aberration can be precisely detected without being affected by an ambient electrical noise.

Further, the aberration correcting section can correct a spherical aberration of the light-gathering optical system in accordance with a spherical aberration precisely detected by the detecting means. Consequently, it is possible to suitably record and reproduce information in an optical recording medium.

For a fuller understanding of the nature and advantages of the invention, reference should be made to the ensuing detailed description taken in conjunction with the accompanying drawings.

BRIEF DESCRIPTION OF THE DRAWINGS

FIGS. 4(a) through 4(c) are explanatory drawings showing a change in shapes of the light-gathering spots appearing on the photodetector when a spherical aberration appears in a light-gathering optical system, which is included in the optical pickup device of FIG. 1.

DESCRIPTION OF THE EMBODIMENTS

The following explanation describes an embodiment of the present invention. Here, the present embodiment is an optical disk recording/reproducing device including an optical pickup device a spherical aberration of a light-gathering optical system.

Figure 2:
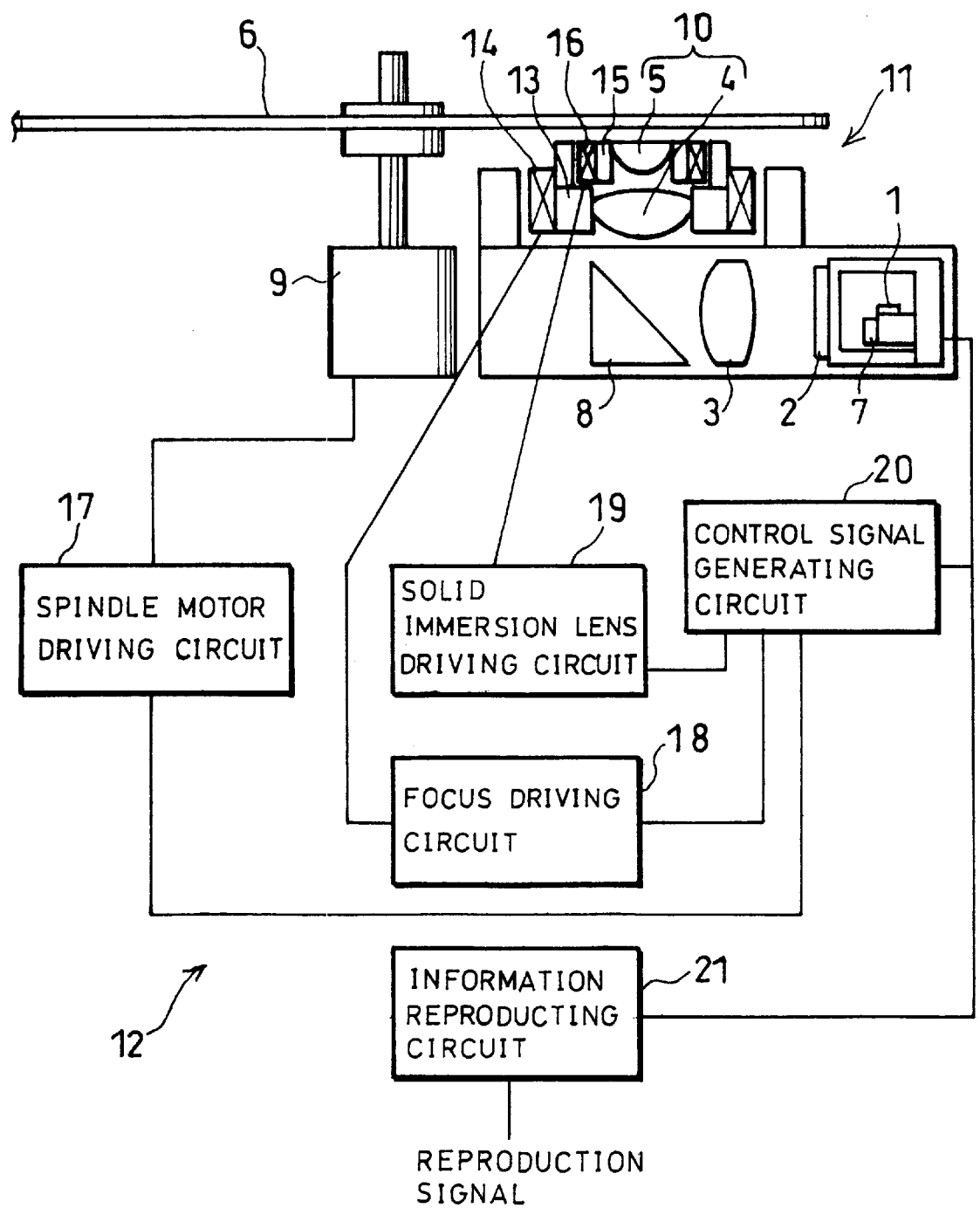
FIG. 2 is a schematic diagram showing an optical disk recording/reproducing device which is provided with the optical pickup device shown in FIG. 1.

As shown in FIG. 2, the optical disk recording/reproducing device of the present embodiment is provided with a spindle motor 9 for rotating and driving a magneto-optical disk 6 acting as a recording medium, an optical pickup device 11 for reproducing information recorded in the magneto-optical disk 6, a driving control section 12 for performing a driving controlling on the spindle motor 9 and the optical pickup device 11, and a magnetic head (not shown) for recording information in the magneto-optical disk 6.

The optical pickup device 11 is provided with a semiconductor laser (light source) 1, a hologram 2, a collimate lens 3, a light-gathering optical system 10 constituted by an object lens (lens element) 4 and a solid immersion lens (lens element) 5, and a light detecting device (detecting means) 7.

Further, between the light-gathering optical system 10 and the collimate lens 3, a mirror 8 is disposed for refracting at about 90° an optical path of a light beam emitted from the light-gathering optical system 10 or a light beam emitted from the collimate lens 3.

Moreover, the edge of the object lens 4 is held by a holder 13, and a focus actuator 14 is disposed on the outer edge of the holder 13. The focus actuator 14 shifts the object lens 4 in a direction of an optical axis. In this arrangement, a driving control is performed on the focus actuators 14 so as to shift the object lens 4 to an appropriate position before performing a focusing control.

Furthermore, the edge of the solid immersion lens 5 is held by a holder 15, and a solid immersion lens actuator 16 is disposed on the outer edge of the holder 15. The solid immersion lens actuator 16 shifts the solid immersion lens 5 in a direction of an optical axis. With this arrangement, a driving control is performed on the solid immersion lens actuator 16 so as to adjust a space between the solid immersion lens 5 and the object lens 4; consequently, it is possible to correct a spherical aberration appearing in the light-gathering optical system 10.

The driving control section 12 is constituted by a spindle motor driving circuit 17 for performing a driving control on the spindle motor 9; a focus driving circuit 18 for performing a driving control on the focus actuator 14; a solid immersion lens driving circuit 19 for performing a driving control on the solid immersion lens actuator 16; a control signal generating circuit 20 for generating a control signal for the spindle motor driving circuit 17, the focus driving circuit 18, and the solid immersion lens driving circuit 19; and an information reproducing circuit 21 for reproducing information in response to a signal sent from the light detecting device 7 and for generating a reproduction signal.

Figure 1:
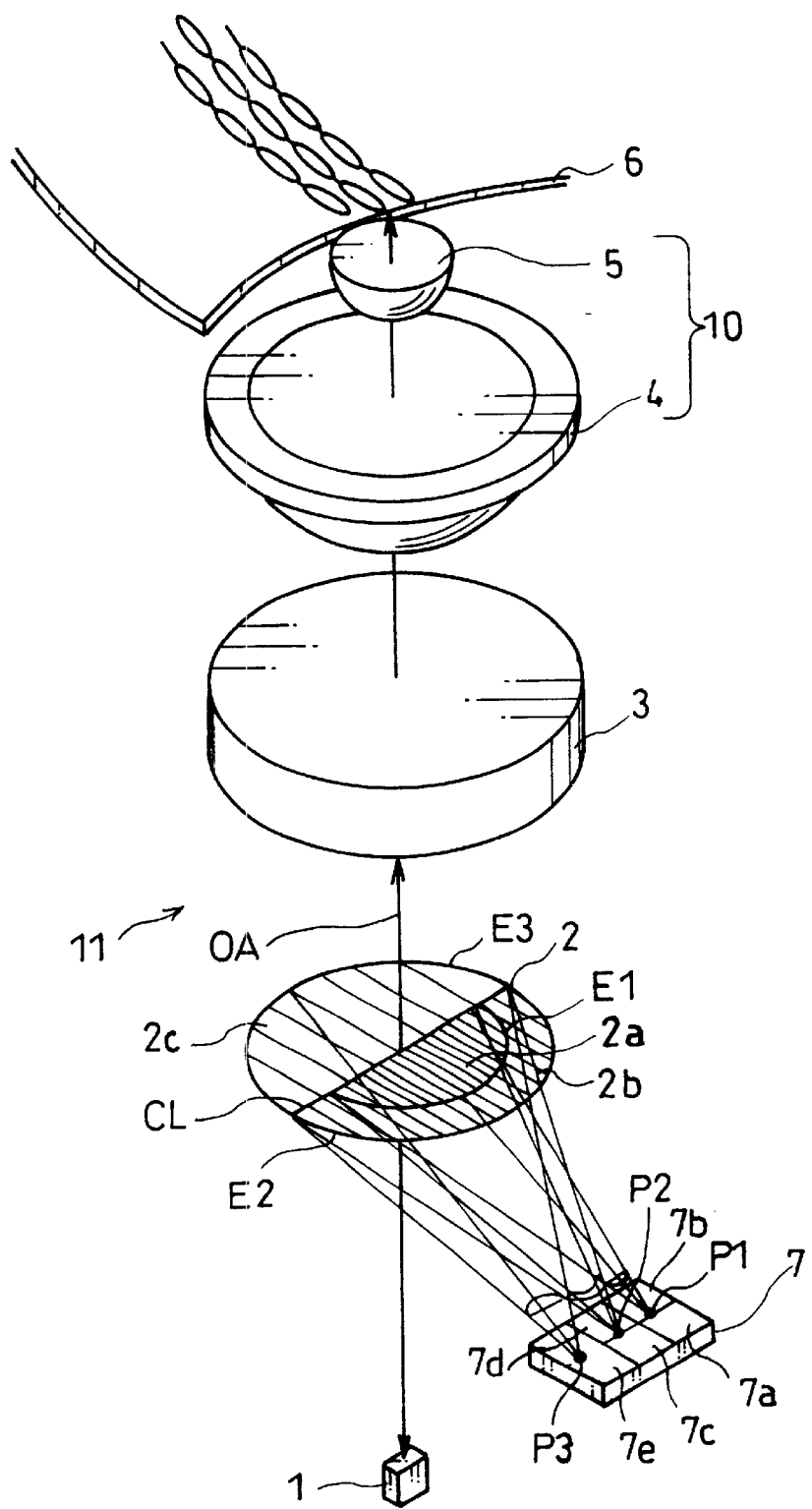
FIG. 1 is a schematic diagram showing an optical pickup device of the present invention.

Here, referring to FIG. 1, the following explanation discusses the detail of the optical pickup device 11. For convenience of explanation, the mirror 8 of FIG. 2 is omitted in the optical pickup device 11 shown in FIG. 1.

In the optical pickup device 11, the hologram 2, the collimate lens 3, the object lens 4 and the solid immersion lens 5 are disposed on an optical axis OA, which is formed between an emitting surface of the semiconductor laser 1 and a reflecting surface of the magneto-optical disk 6. The light detecting device 7 is disposed around a focus position of diffraction light emitted from the hologram 2.

Therefore, in the optical pickup device 11, a light emitted from the semiconductor laser 1 (hereinafter, referred to as a light beam) is transmitted through the hologram 2 as diffraction light of order 0. The light beam is changed into parallel light in the collimate lens 3 and is gathered on a predetermined position of the magneto-optical disk 6 via the object lens 4 and the solid immersion lens 5. Meanwhile, a light beam reflected from the magneto-optical disk 6 is transmitted through the solid immersion lens 5, the object lens 4, and the collimate lens 3, and is emitted into the hologram 2. And then, the light beam is diffracted in the hologram 2 and is gathered on the optical detector 7.

The hologram 2 is constituted by three areas of (1) a first area 2a which is surrounded by a straight line CL being orthogonal to the optical axis OA and a first semicircle E1 having the optical axis OA at the center, (2) a second area 2b which is surrounded by (a) the first semicircle E1, (b) a second semicircle E2 including the straight line CL with a larger diameter than the first semicircle E1 and being disposed on the same side as the first semicircle E1, and (c) the straight line CL, and (3) a third area 2c which is surrounded by the straight line CL and a third semicircle E3 which opposes the first semicircle E1 and the second semicircle E2 at the straight line CL.

The hologram 2 transmits light emitted from the semiconductor laser 1 to the magneto-optical disk 6 as diffraction light of order 0, and the hologram 2 diffracts light reflected from the magneto-optical disk 6 and directs the light into the optical detector 7.

Further, the areas of the hologram 2 are formed such that light-gathering spots are separately formed so as to correspond to the areas in response to light emitted from the magneto-optical disk 6. Hence, three light-gathering spots are formed for light transmitted through the three areas of the hologram 2 from the magneto-optical disk 6.

Moreover, the light detecting device 7 is constituted by five photodetectors 7a through 7e. The photodetector (first photodetector) 7a and the photodetector (second photodetector) 7b are disposed side by side so as to form a first light-receiving section. The photodetector (third photodetector) 7c and the photodetector (fourth photodetector) 7d are disposed side by side so as to form a second light-receiving section. The photodetector 7e acts as a third light-receiving section by itself.

Hence, light beams diffracted in the areas of the hologram 2 are respectively directed into the light-receiving sections of the light detecting device 7.

Namely, regarding a light reflected from the magneto-optical disk 6, when the light beam is emitted through the first area 2a, which is adjacent to the optical axis OA, as a first light beam, a light-gathering spot P1 is formed on a boundary between the photodetector 7a and the photodetector 7b which constitute the first light-receiving section. When a light beam is emitted through the second area 2b, which is disposed outside the first area 2a, as a second light beam, a light-gathering spot P2 is formed on a boundary between the photodetector 7c and the photodetector 7d which constitute the second light-receiving section. When a light beam is emitted through the third area 2c as an information signal of the magneto-optical disk 6, a light-gathering spot P3 is formed on the photodetector 7e acting as the third light-receiving section.

Additionally, each of the photodetectors 7a through 7e changes received light (light signal) into an electrical signal and outputs the changed electrical signal to the control signal generating circuit 20 and the information reproducing circuit 21.

Thus, among light beams which are reflected from the magneto-optical disk 6 and are transmitted through the light-receiving system 10 constituted by the solid immersion lens 5 and the object lens 4, the first light beam, which is diffracted in the first area 2a being adjacent to the optical axis OA of the hologram 2, is emitted into the photodetectors 7a and 7b constituting the first light-receiving section of the light detecting device 7.

Further, among light beams which are reflected from the magneto-optical disk 6 and are transmitted through the light-receiving system 10 constituted by the solid immersion lens 5 and the object lens 4, the second light beam, which is diffracted in the second area 2b disposed outside the first area 2a of the hologram 2, is emitted into the photodetectors 7c and 7d constituting the second light-receiving section of the light detecting device 7.

Furthermore, a light beam, which is reflected from the magneto-optical disk 6 and is transmitted through the light-receiving system 10 constituted by the solid immersion lens 5 and the object lens 4, is diffracted in the third area 2c of the hologram 2 and is emitted into the photodetector 7e acting as the third light-receiving section of the light-detecting device 7.

In the photodetectors 7a through 7e, received light signals are respectively changed into electrical signals S1 through S5.

Electrical signals obtained in the photodetectors 7a through 7e are outputted to the control signal generating circuit 20 shown in FIG. 2 and are used for adjusting a shift of the object lens 4 and the solid immersion lens 5 in the light-gathering optical system 10.

And then, the electrical signals are outputted to the information reproducing circuit 21 and are changed into a reproduction signal. Namely, an information signal (reproduction signal) RF recorded in the magneto-optical disk 6 is obtained in the following equation.

$$RF = S1 + S2 + S3 + S4 + S5$$

Figure 3A:
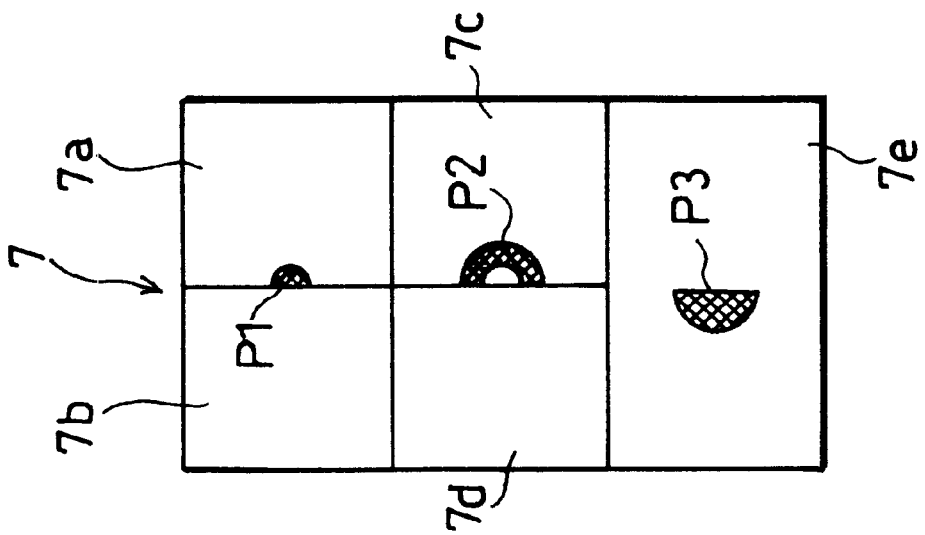
FIGS. 3(a) through 3(c) are explanatory drawings showing a change in shapes of light-gathering spots appearing on a photodetector when a light beam is out of focus in the optical pickup device of FIG. 1.
Figure 3B:
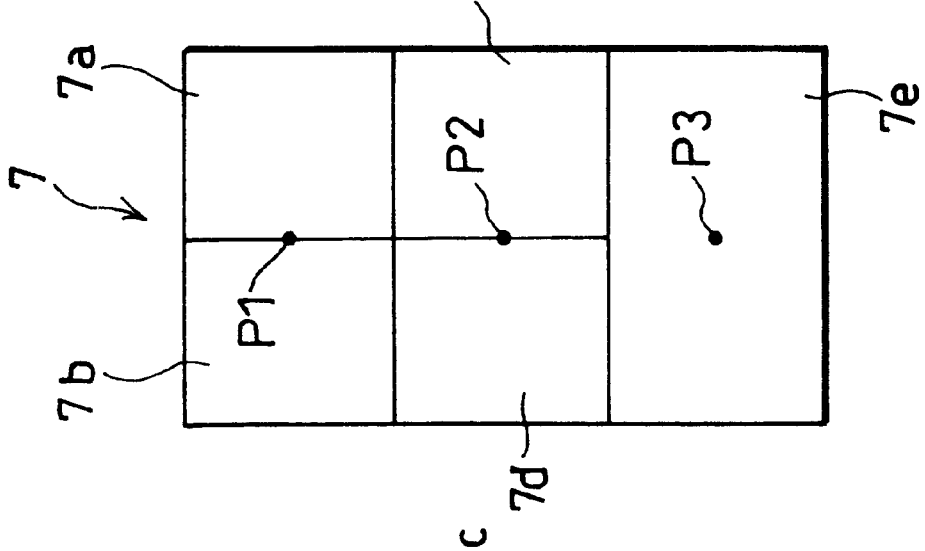

In a state in which the magneto-optical disk 6 has a suitable thickness, a relative positional relationship is favorable between the solid immersion lens 5 and the object lens 4, and no spherical aberration appears, in the case of correct focus on the magneto-optical disk 6, namely, in the case of light coming into a focus, each of the light-gathering spots P1 through P3 formed in the photodetectors 7a through 7e has virtually the same size as shown in FIG. 3(b).

In this case, among light beams diffracted in the hologram 2, the first light beam, which is adjacent to the optical axis OA, is brought into focus, and the light-gathering spot P1 is formed so as to have the same irradiation area in each of the photodetectors 7a and 7b. Namely, it is found that the electrical signal S1 obtained from the photodetector 7a has the same value as the electrical signal S2 obtained from the photodetector 7b.

Here, a focus error signal FES, which shows a focus error of a light beam emitted to the magneto-optical disk 6, is represented by the following equation.

$$FES = S1 - S2$$

Therefore, when the electrical signals S1 and S2 obtained in the photodetectors 7a and 7b equal to each other as described above, namely, when light is brought into a focus, the focus error signal FES is 0.

Figure 3C:
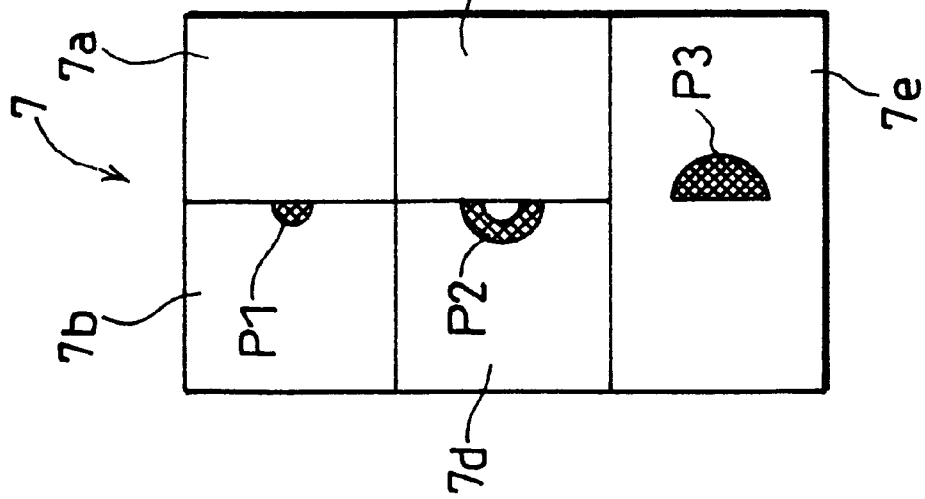

Moreover, when a light beam emitted to the magneto-optical disk 6 goes out of focus, the light-gathering spots P1 through P3, which are formed on the photodetectors 7a through 7e, expand in semicircular shapes. For example, when the magneto-optical disk 6 shifts so as to be away from the object lens 4, as shown in FIG. 3(a), the light-gathering spot P1 expands in a semicircular shape on the photodetector 7b. Meanwhile, when the magneto-optical disk 6 shifts so as to be closer to the object lens 4, as shown in FIG. 3(c), the light-gathering spot P1 expands in a semicircular shape on the photodetector 7a.

Namely, when the magneto-optical disk 6 shifts so as to be away from the object lens 4, a value of the electrical signal S2 changed by the photodetector 7b is larger than that of the electrical signal S1 changed by the photodetector 7a. Consequently, the focus error signal FES has a negative value.

Meanwhile, when the magneto-optical disk 6 shifts so as to be closer to the object lens 4, a value of the electrical signal S1 changed by the photodetector 7a is larger than that of the electrical signal S2 changed by the photodetector 7b. Consequently, the focus error signal FES has a positive value.

Therefore, in order to set the focus error signal FES at 0, the focus actuator 14 shifts the object lens 4 in a direction of the optical axis OA. The focus actuator 14 is disposed on the holder 13 which holds the object lens 4. In this case, the driving amount of the focus actuator 14, which is driven by the focus driving circuit 18, is adjusted by a control signal obtained in the control signal generating circuit 20, in accordance with the electrical signals S1 and S2 obtained in the photodetectors 7a and 7b.

Generally, when a substrate thickness of the magneto-optical disk 6 is not appropriate and the relative positional relationship is not desirable between the solid immersion lens 5 and the object lens 4, a spherical aberration appears in the light-gathering optical system 10 of the optical pickup device having the above construction.

Here, the spherical aberration refers to shift between (a) a focus of a light beam passing through the center of the light-gathering optical system and (b) a focus of a light beam passing through an edge of the system.

As described above, in the event of a spherical aberration in the light-gathering optical system 10, even when the focus is correct in the light-gathering optical system 10, namely, even when a difference is 0 between electrical signals of the photodetectors 7a and 7b, a difference is not 0 but a positive or negative value between electrical signals of the photodetectors 7c and 7d, as shown in FIGS. 4(a) and 4(c). Hence, it is found that a positive or negative spherical aberration appears.

Figure 5A:
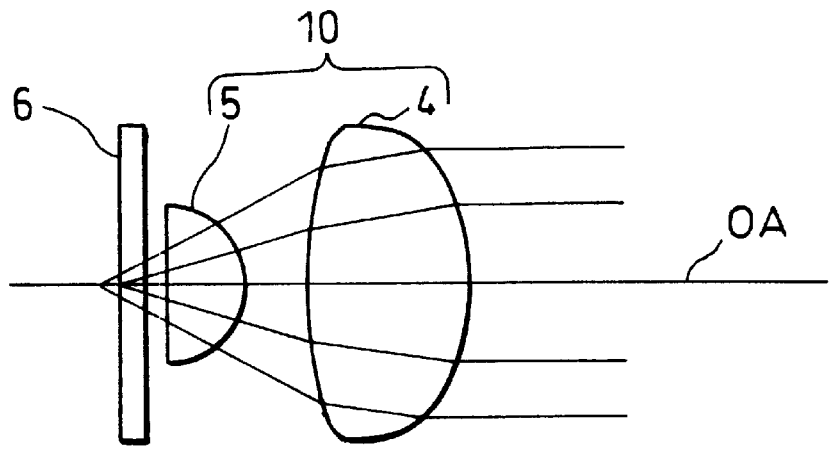
FIGS. 5(a) through 5(c) are explanatory drawings showing a spherical aberration appearing in the light-gathering optical system, which is included in the optical pickup device of FIG. 1.
Figure 5B:
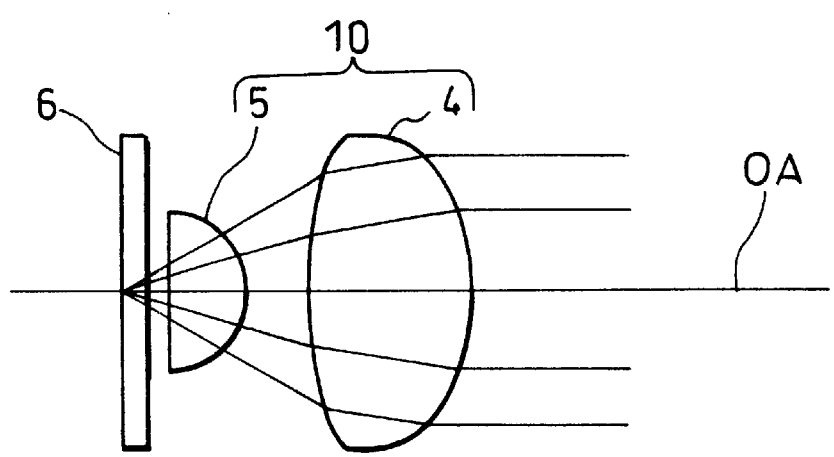

For instance, when no spherical aberration appears and light is brought into a focus, all light beams transmitted through the solid immersion lens 5 and the object lens 4, which constitute the light-gathering optical system 10, are gathered on a spot of the optical axis OA on the magneto-optical disk 6, as shown in FIG. 5(b). In this case, the light beams are formed into the light-gathering spots P1 through P3 in shapes shown in FIG. 4(b) in the light detecting device 7.

Figure 5C:
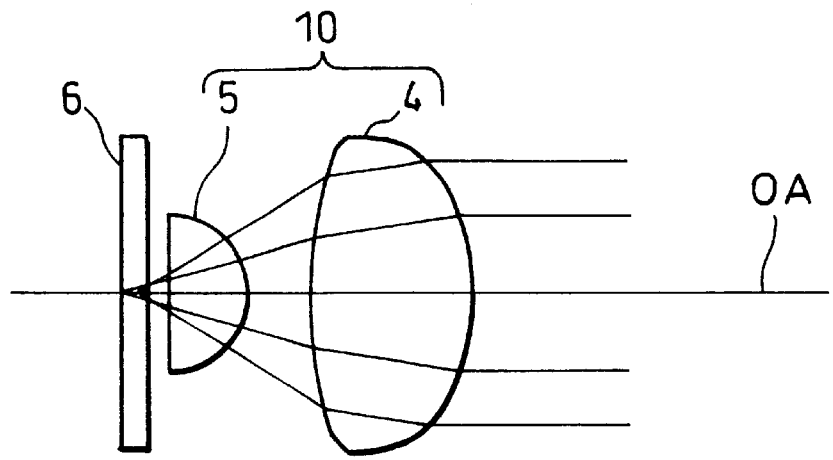
Figure 6:
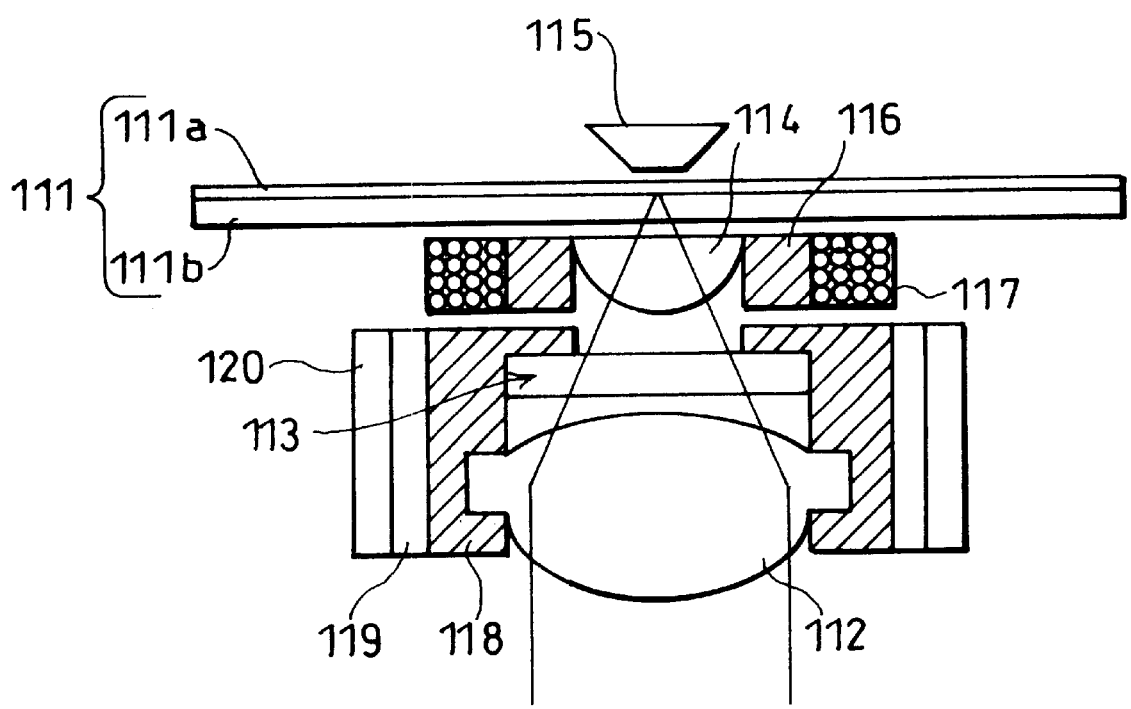
FIG. 6 is a schematic diagram showing a conventional optical pickup device.

Meanwhile, when a positive or negative spherical aberration appears in the light-gathering optical system 10, as shown in FIGS. 5(a) and 5(c), light beams transmitted through the light-gathering optical system 10 are not gathered on a spot of the magneto-optical disk 6. In this case, it is assumed that a focus of the light beam, which is adjacent to the optical axis OA, is at a suitable position of the magneto-optical disk 6. For instance, when a positive spherical aberration appears in the light-gathering optical system 10, as shown in FIG. 5(a), the focus position of a light beam passing through an edge of the light-gathering optical system 10 is farther from the solid immersion lens 5 than the focus position of a light beam passing near the optical axis OA. Meanwhile, when a negative spherical aberration appears in the light-gathering optical system 10, as shown in FIG. 5(c), the focus position of a light beam passing through an edge of the light-gathering optical system 10 is closer to the solid immersion lens 5 than the focus position of a light beam passing near the optical axis OA.

Therefore, in a state in which the focus actuator 14 drives the object lens 4 so as to set the focus error signal FES at 0, for example, a substrate thickness of the magneto-optical disk 6 is different from a predetermined thickness so as to cause a positive spherical aberration, a light beam passing through an edge of the light-gathering optical system 10 varies in the same manner as when the magneto-optical disk 6 comes close to the solid immersion lens 5. In this case, as shown in FIG. 4(c), the light-gathering spot P2 on the photodetectors 7c and 7d expands in a half-doughnut shape on the photodetector 7c.

In contrast, in the case of a negative spherical aberration, a light beam passing through an edge of the light-gathering optical system 10 varies in the same manner as when the magneto-optical disk 6 is away from the solid immersion lens 5. Hence, as shown in FIG. 4(a), the light-gathering spot P2 on the photodetectors 7c and 7d expands in a half-doughnut shape on the photodetector 7d.

Thus, when the focus error signal FES is kept at 0, a spherical aberration signal SA, which shows a spherical aberration appearing in the light-gathering optical system 10, is represented as follows by using the electrical signals Si through S5 obtained from the photodetectors 7a through 7e.

$$SA = S3 - S4$$

Additionally, when the focus error signal FES is not kept at 0, the spherical aberration signal SA is represented by the following equation in view of the focus error signal FES.

$$SA = (S3 - S4) - (S1 - S2) \times K \text{ ($K$ is a constant)}$$

The spherical aberration signal SA is generated in the control signal generating circuit 20 and is outputted to the solid immersion lens driving circuit 19.

Therefore, the solid immersion lens driving circuit 19 performs a driving control on the solid immersion lens actuator 16, which is disposed outside the holder 15 holding the solid immersion lens 5, in response to the spherical aberration signal SA. Hence, the spherical aberration is corrected.

Specifically, when the spherical aberration signal SA shows a positive spherical aberration, the solid immersion lens driving circuit 19 performs a driving control of the solid immersion lens actuator 16 so as to increase a space between the solid immersion lens 5 and the object lens 4. Meanwhile, when the spherical aberration signal SA shows a negative spherical aberration, the solid immersion lens driving circuit 19 performs a driving control on the solid immersion lens actuator 16 so as to reduce a space between the solid immersion lens 5 and the object lens 4.

As mentioned above, in accordance with the spherical aberration signal SA, correction is carried out so as to eliminate a spherical aberration appearing in the light-gathering optical system 10; thus, upon reproducing information, it is possible to favorably reproduce information recorded in the magneto-optical disk 6. Further, upon recording information, a magnetic head (not shown) is disposed such that the magneto-optical disk 6 is placed between the magnetic head and the optical pickup device 11; therefore, information can be written into the magneto-optical disk 6 in a desirable manner.

Moreover, the correction of a spherical aberration can be carried out when the magneto-optical disk 6 is mounted on the optical recording/reproducing device, or the correction can be carried out as necessary while information is recorded or reproduced after the magneto-optical disk 6 has been mounted on the optical recording/reproducing device.

For example, the semiconductor laser 1 records spherical aberration information in a predetermined area of the magneto-optical disk 6 after the light detecting device 7 detects the spherical aberration of the light-gathering optical system 10. Namely, after the light detecting device 7 detects a spherical aberration of the light-gathering optical system 10, the semiconductor laser 1 records the spherical aberration information in a predetermined area of the magneto-optical disk 6 only when the magneto-optical disk 6 is first mounted.

For instance, regarding the magneto-optical disk 6, when unevenness of a substrate thickness is maintained at a fixed value or less in a single disk, a spherical aberration is upon first mounting of the magneto-optical disk 6, the semiconductor laser 1 records spherical aberration information in a predetermined area of the magneto-optical disk 6, a distance is adjusted between the solid immersion lens 5 and the object lens 4 in accordance with the spherical aberration information, and then, the distance is maintained between the lenses. In this case, only upon exchanging the magneto-optical disk 6, a spherical aberration is corrected in the light-gathering optical system 10. Further, the semiconductor laser 1 also acts as a spherical aberration information recording means for recording spherical aberration information in a predetermined area of the magneto-optical disk 6.

Meanwhile, regarding the magneto-optical disk 6, when unevenness of the substrate thickness is large in a single disk, an aberration amount is continuously detected upon recording and reproducing information, and a distance is varied between the solid immersion lens 5 and the object lens 4 so as to correct the spherical aberration. In this case, when the magneto-optical disk 6 records and reproduces information, correction is continuously performed on a spherical aberration in the light-gathering optical system 10. At this time, detection of a spherical aberration is continuously performed in the light-gathering optical system 10 when information is recorded and reproduced in the magneto-optical disk 6. Thus, information on the detected spherical aberration is not recorded in the magneto-optical disk 6.

As described above, a spherical aberration is corrected in the light-gathering optical system 10 only when the magneto-optical disk 6 is exchanged. In this case, the correction time can be long. Therefore, it is possible to adopt the low-speed solid immersion lens actuator 16 in order to adjust a distance between the object lens 4 and the solid immersion lens 5 of the light-gathering optical system 10. This arrangement makes it possible to manufacture the optical pickup device, which can correct a spherical aberration, at low cost.

Meanwhile, when correction is continuously carried out on a spherical aberration in the light-gathering optical system 10 upon recording and reproducing in the magneto-optical disk 6, it is necessary to provide the high-speed solid immersion lens actuator 16, which operates at a speed corresponding to a rotation speed of the magneto-optical disk 6. However, it is possible to set large manufacturing tolerances of a disk thickness, so that the manufacturing cost can be reduced for the magneto-optical disk 6.

Additionally, in the present embodiment, the hologram 2 is used as a means for directing a light beam reflected on the magneto-optical disk 6 to the light detecting device 7. However, the means is not limited to the hologram 2. For instance, it is possible to adopt a combination of a beam splitter and a wedge prism which is divided into a semicircular or a half-doughnut shape. However, the hologram 2 is preferable in view of a smaller version of the device.

Furthermore, the focus error signal FES is determined depending upon whether focus is correct or not in the light detecting device 7, regarding a light beam passing near the optical axis OA (first light beam) among light beams passing through the light-gathering optical system 10. However, in addition, the focus error signal FES can be determined depending upon whether focus is correct or not in the light detecting device 7, regarding a light beam passing through an edge of the light-gathering optical system 10 (second light beam) among light beams passing through the light-gathering optical system 10. However, the second light beam passing through an edge of the light-gathering optical system 10 is readily affected by a spherical aberration, and it is difficult to precisely adjust the focus position. Therefore, it is preferable to use the first light beam passing near the optical axis OA to adjust a focus error.

Moreover, the present embodiment is directed to detection and correction of a spherical aberration in the light-gathering optical system 10, which is constituted by the object lens 4 and the solid immersion lens 5. The present invention is not limited to this arrangement. For example, the present invention is applicable to a light-gathering system constituted by a plurality of lens elements.

As described above, a first aberration detector includes a detecting means for detecting a spherical aberration of a light-gathering optical system in accordance with two focus positions of a first light beam passing near an optical axis and a second light beam passing outside the first light beam, among light beams passing through the light-gathering optical system.

For this reason, the detecting means divides light beams passing through the light-gathering optical system into the first light beam passing near the optical axis and the second light beam passing outside the first light beam, and the detecting means detects a spherical aberration of the light-gathering optical system in accordance with the focus positions of the light beams. With this arrangement, it is possible to optically detect a spherical aberration appearing in the light-gathering optical system.

Hence, unlike a conventional art which electrically detects a spherical aberration appearing in the light-gathering optical system, the present invention can precisely detect a spherical aberration without being affected by an ambient electrical noise.

As mentioned above, when a spherical aberration is precisely detected in the light-gathering optical system, it is possible to suitably correct a spherical aberration of the light-gathering optical system.

As described above, with the arrangement of the first aberration detector, a second aberration detector of the present invention has a construction in which the detecting means includes (a) first and second light receiving sections for separately receiving the first and second light beams and (b) a hologram for directing the first and second light beams respectively to the first and second light-receiving sections, among light beams passing through the light-gathering optical system, and the detecting means detects a spherical aberration of the light-gathering optical system in accordance with the outputs of the light-receiving sections.

For this reason, the hologram is available for directing the first and second light beams, which are necessary for detecting a spherical aberration, separately to the light-receiving sections; hence, a light beam can be diffracted in a desired direction with a smaller and simpler construction.

As specific examples of the hologram and a photodetector, the following explanation discusses third and fourth aberration detectors of the present invention.

As described above, with the arrangement of the second aberration detector, a third aberration detector of the present invention has a construction in which the hologram includes a first area and a second area, the first area being surrounded by (a) a straight line which is orthogonal to the optical axis of a light beam passing through the light-gathering optical system, and (b) a first semicircle having the optical axis at the center; and the second area being surrounded by (a) a second semicircle which has a larger diameter than the first semicircle with the optical axis serving as the center and is disposed on the same side as the first semicircle from the straight line, (b) the straight line, and (c) the first semicircle, the first light-receiving section has a first photodetector and a second photodetector side by side for changing a light signal into an electrical signal; the second light-receiving section has a third photodetector and a fourth photodetector side by side for changing a light signal into an electrical signal; and the detecting means compares (a) a difference between the electrical signals of the first and second photodetectors and (b) a difference between the electrical signals of the third and fourth photodetectors, and detects a spherical aberration of the light-gathering optical system; the difference between the electrical signals of the first and second photodetectors being obtained by irradiating the first light beam, which is directed from the first area of the hologram, onto a boundary between the first and second photodetectors, the difference between the signals of the third and fourth photodetectors being obtained by irradiating the second light beam, which is directed from the second area of the hologram, onto a boundary between the third and fourth photodetectors.

As described above, with the arrangement of the third aberration detector, a fourth aberration detector has a construction in which when an electrical signal obtained in the first photodetector is represented by S1, an electrical signal obtained in the second photodetector is represented by S2, an electrical signal obtained in the third photodetector is represented by S3, and an electrical signal obtained in the fourth photodetector is represented by S4, a spherical aberration signal SA appearing in the light-gathering optical system is represented by:

$$SA=(S3-S4)-(S1-S2)\times K \text{ ($K$ is a constant).}$$

As described above, a first pickup device of the present invention is provided with a light source; a light-gathering optical system for gathering light emitted from the light source onto a recording medium; a detecting means for detecting a spherical aberration of the light-gathering optical system in accordance with two focus positions of a first light beam passing near an optical axis, and a second light beam passing outside the first light beam, among light beams being reflected on the recording medium and passing through the light-gathering optical system; and a aberration correcting means for correcting a spherical aberration of the light-gathering optical system in accordance with the output of the detecting means.

For this reason, the detecting means divides light beams passing through the light-gathering optical system into the first light beam passing near the optical axis and the second light beam passing outside the first light beam, and the detecting means detects a spherical aberration of the light-gathering optical system in accordance with the focus positions of the light beams. Thus, it is possible to optically detect a spherical aberration appearing in the light-gathering optical system.

Therefore, unlike a conventional art which electrically detects a spherical aberration appearing in the light-gathering optical system, the present invention can precisely detect a spherical aberration without being affected by an ambient electrical noise.

Furthermore, the aberration correcting means corrects a spherical aberration of the light-gathering optical system in accordance with a spherical aberration amount which is precisely detected by the detecting means. Hence, in the case of the optical pickup device having the above construction, it is possible to suitably record or reproduce information for the recording medium.

As examples of devices for detecting a spherical aberration of the light-gathering optical system, the following explanation discusses second and third optical pickup devices of the present invention.

As described above, with the arrangement of the first optical pickup device, a second optical pickup device of the present invention has a construction in which the detecting means includes first and second light-receiving sections for separately receiving the first and second light beams, and a hologram for directing the first and second light beams respectively to the first and second light-receiving sections, among light beams which are reflected on the recording medium and pass through the light-gathering optical system; and the detecting means detects an aberration of the light-gathering optical system in accordance with the outputs of the light-receiving sections.

As described above, with the arrangement of the second optical pickup device, a third optical pickup device of the present invention has a construction in which the hologram includes a first area and a second area, the first are being surrounded by (a) a straight line, which is orthogonal to the optical axis of a light beam passing through the light-gathering optical system, and (b) a first semicircle having the optical axis at the center; the second area being surrounded by (a) a second semicircle which has a larger diameter than the first semicircle with the optical axis serving as the center and is placed on the same side as the first semicircle from the straight line, (b) the straight line, and (c) the first semicircle, the first light-receiving section has a first photodetector and a second photodetector side by side for changing a light signal into an electrical signal; the second light-receiving section has a third photodetector and a fourth photodetector side by side for changing a light signal into an electrical signal; and the detecting means compares (a) a difference between the electrical signals of the first and second photodetectors and (b) a difference between the electrical signals of the third and fourth photodetectors, and detects a spherical aberration of the light-gathering optical system; the difference between the electrical signals the first and second photodetectors being obtained by irradiating the first light beam, which is directed from the first area of the hologram, onto a boundary between the first and second photodetectors, the difference between the electrical signals of the third and fourth photodetectors being obtained by irradiating the second light beam, which is directed from the second area of the hologram, onto a boundary between the third and fourth photodetectors.

Further, as an example of a device for correcting a detected spherical aberration, the following fourth optical pickup device is available.

As described above, with the arrangement of any one of the first through third optical pickup devices, a fourth optical pickup device of the present invention has a construction in which at least two lens elements are disposed with a predetermined space, and an aberration correcting means corrects a spherical aberration of the light-gathering optical system by adjusting the space between the lens elements in accordance with the output of the detecting means.

Moreover, as described above, with the arrangement of any one of the first through fourth optical pickup devices, a fifth optical pickup device of the present invention has a construction in which the detecting means detects a focus error regarding the recording medium in accordance with either a difference between electrical signals of the first photodetector and the second photodetector of the first light-receiving section, or a difference between electrical signals of the third photodetector and the fourth photodetector of the second light-receiving section.

Therefore, with the detecting means, it is possible to simultaneously detect a spherical aberration of the light-gathering optical system and an error of focus on the recording medium (focus error). Thus, even in the case of a optical recording medium having different substrate thicknesses, information can be positively recorded and reproduced.

As described above, with the arrangement of any one of the first through fifth optical pickup devices, a sixth optical pickup device of the present invention has a construction in which an aberration information recording means is provided for recording spherical aberration information in a predetermined area of the recording medium after the detecting means detects a spherical aberration of the light-gathering optical system.

The spherical aberration information of the light-gathering system is recorded in a predetermined area of the recording medium; thus, upon reproducing and recording information in the same recording medium, it is not necessary to detect a spherical aberration again. With this arrangement, when information is recorded and reproduced repeatedly in the same recording medium, information can be promptly recorded and reproduced after the first time.

As described above, with the arrangement of the sixth optical pickup device, a seventh optical pickup device of the present invention has a construction in which the aberration information recording means records spherical aberration information in a predetermined area of the recording medium merely when the recording medium is placed after the detecting means detects a spherical aberration of the light-gathering optical system.

Therefore, merely when the recording medium is placed, a spherical aberration of the light-gathering optical system is detected and aberration information is recorded in the recording medium. Hence, a device which corrects an aberration of the light-gathering optical system, namely, a device which adjusts a space between the lens elements can be operated at a low speed. This arrangement makes it possible to reduce the manufacturing cost of the device which corrects an aberration.

The invention being thus described, other variations are possible. Such variations are not to be regarded as a departure from the spirit and scope of the invention, and all such modifications as would be obvious to one skilled in the art are intended to be included within the scope of the following claims.

What is claimed is:

1. A recording/reproducing device comprising:
    an optical pickup comprising:
        a light source,
        a light-gathering optical system for gathering light, which is emitted from the light source, on a recording medium,
        detecting means for detecting a spherical aberration of the light-gathering optical system in accordance with two focus positions of a first light beam passing through the light-gathering optical system in an area adjacent an optical axis and a second light beam passing outside the first light beam, among light beams passing through the light-gathering optical system;
        aberration correcting means for correcting the spherical aberration of the light-gathering optical system in accordance with an output of the detecting means; and
        an aberration information recording means for recording spherical aberration information in a predetermined area of said recording medium after said detecting means detects a spherical aberration of said light-gathering optical system.

2. The recording/reproducing device as defined in claim 1, wherein said detecting means includes:
    first and second light-receiving sections which separately receive said first and second light beams, and
    a hologram for directing said first and second light beams respectively to the first and second light-receiving sections, from light beams which are reflected on said recording medium and pass through said light-gathering optical system,
    said detecting means detecting a spherical aberration of said light-gathering optical system in accordance with an output of each of said light-receiving sections.

3. The recording/reproducing device as defined in claim 2, wherein said hologram includes a first area and a second area, said first area being surrounded by (a) a straight line which is orthogonal to the optical axis of a light beam passing through the light-gathering optical system, and (b) a first semicircle having the optical axis at a center; said second area being surrounded by (a) a second semicircle which has a larger diameter than said first semicircle with the optical axis serving as a center and is disposed on the same side as said first semicircle from the straight line, (b) the straight line, and (c) said first semicircle,
    said first light-receiving section has a first photodetector and a second photodetector side by side for changing a light signal into an electrical signal,
    said second light-receiving section has a third photodetector and a fourth photodetector side by side for changing a light signal into an electrical signal, and
    said detecting means compares (a) a difference between the electrical signals of the first and second photodetectors and (b) a difference between the electrical signals of the third and fourth photodetectors, so as to detect a spherical aberration of the light-gathering optical system; the difference between the electrical signals of the first and second photodetectors being obtained by irradiating said first light beam, which is directed from the first area of the hologram, onto a boundary between the first and second photodetectors, the difference between the electrical signals of the third and fourth photodetectors being obtained by irradiating said second light beam, which is directed from the second area of the hologram, onto a boundary between the third and fourth photodetectors.

4. The recording/reproducing device as defined in claim 3, wherein said detecting means detects a focus error regarding said recording medium in accordance with either a difference between electrical signals of said first photodetector and said second photodetector of said first light-receiving section, or a difference between electrical signals of said third photodetector and said fourth photodetector of said second light-receiving section.

5. The recording/reproducing device as defined in claim 1, wherein, only when said recording medium is first mounted, said aberration information recording means records spherical aberration information in a predetermined area of said recording medium after said detecting means detects a spherical aberration of said light-gathering optical system.

6. The recording/reproducing device as defined in claim 1, wherein said light-gathering optical system includes at least two lens elements disposed with a predetermined space, and said aberration correcting means adjusts a space between said lens elements in accordance with an output of said detecting means so as to correct a spherical aberration of said light-gathering optical system.

7. The recording/reproducing device as defined in claim 1, wherein said detecting means always performs detecting of the spherical aberration while recording or reproducing with the recording medium.

8. An aberration detector comprising detecting means for detecting a spherical aberration of a light-gathering optical system in accordance with only one of two focus positions of a first light beam passing through a first semicircle adjacent an optical axis and a second light beam passing outside the first light beam, bounded by a second semicircle outside of the first semicircle, among light beams passing through the light-gathering optical system.

9. The aberration detector defined in claim 8, wherein the spherical aberration is detected in accordance with a focus position of a light beam passing through a periphery of plural areas in concentric circles.

10. The aberration detector as defined in claim 8, wherein said detecting means includes:
   a light-receiving section which receives one of said first or second light beams, and
   a hologram which divides light beams passing through said light-gathering optical system into said first and second light beams and directs one of said first or second light beams to the light-receiving section,
   said detecting means detecting a spherical aberration of said light-gathering optical system in accordance with an output of said light-receiving section.

11. The aberration detector as defined in claim 10, wherein said hologram includes a first area and a second area, said first area being surrounded by (a) a straight line which is orthogonal to the optical axis of a light beam passing through the light-gathering optical system, and (b) said first semicircle having the optical axis at a center; said second area being surrounded by (a) said second semicircle which has a larger diameter than said first semicircle with the optical axis serving as a center and is disposed on the same side as said first semicircle from the straight line, (b) the straight line, and (c) said first semicircle,
   said light-receiving section has a first photodetector and a second photodetector side by side for changing a light signal of said one of said first or second light beams into an electrical signal, and said detecting means compares the electrical signals of the first and second photodetectors so as to detect a spherical aberration of said light-gathering optical system.

12. The aberration detector as defined in claim 11, wherein when an electrical signal obtained in said first photodetector is represented by S1, an electrical signal obtained in said second photodetector is represented by S2, a spherical aberration signal SA appearing in said light-gathering optical system is represented by:

$$SA=S1-S2.$$

13. An optical pickup device comprising:
   a light source,
   a light-gathering optical system for gathering light, which is emitted from the light source, on a recording medium,
   detecting means for detecting a spherical aberration of the light-gathering optical system in accordance with only one of two focus positions of a first light beam passing through the light-gathering optical system in an area adjacent an optical axis and a second light beam passing outside the first light beam, among light beams passing through the light-gathering optical system; and
   aberration correcting means for correcting the spherical aberration of the light-gathering optical system in accordance with an output of the detecting means.

14. The optical pickup device as defined in claim 13, wherein said light-gathering optical system includes at least two lens elements disposed with a predetermined space, and
   said aberration correcting means adjusts a space between said lens elements in accordance with an output of said detecting means so as to correct a spherical aberration of said light-gathering optical system.

15. The optical pickup device as defined in claim 13, wherein said detecting means includes:
   first and second light-receiving sections which separately receive said first and second light beams, and
   a hologram for directing said first and second light beams respectively to the first and second light-receiving sections, from light beams which are reflected on said recording medium and pass through said light-gathering optical system,
   said detecting means detecting a spherical aberration of said light-gathering optical system in accordance with an output of one of said light-receiving sections.

16. The optical pickup device as defined in claim 15, wherein said hologram includes a first area and a second area, said first area being surrounded by (a) a straight line which is orthogonal to the optical axis of a light beam passing through the light-gathering optical system, and (b) a first semicircle having the optical axis at a center; said second area being surrounded by (a) a second semicircle which has a larger diameter than said first semicircle with the optical axis serving as a center and is disposed on the same side as said first semicircle from the straight line, (b) the straight line, and (c) said first semicircle,
   said first light-receiving section has a first photodetector and a second photodetector side by side for changing a light signal into an electrical signal,
   said second light-receiving section has a third photodetector and a fourth photodetector side by side for changing a light signal into an electrical signal, and
   said detecting means compares (a) a difference between the electrical signals of the first and second photodetectors and (b) a difference between the electrical signals of the third and fourth photodetectors, so as to detect a spherical aberration of the light-gathering optical system; the difference between the electrical signals of the first and second photodetectors being obtained by irradiating said first light beam, which is directed from the first area of the hologram, onto a boundary between the first and second photodetectors, the difference between the electrical signals of the third and fourth photodetectors being obtained by irradiating said second light beam, which is directed from the second area of the hologram, onto a boundary between the third and fourth photodetectors.

17. The optical pickup device as defined in claim 16, wherein said detecting means detects a focus error regarding said recording medium in accordance with either a difference between electrical signals of said first photodetector and said second photodetector of said first light-receiving section, or a difference between electrical signals of said third photodetector and said fourth photodetector of said second light-receiving section.

18. The optical pickup device as defined in claim 13, further comprising an aberration information recording means for recording spherical aberration information in a predetermined area of said recording medium after said detecting means detects a spherical aberration of said light-gathering optical system.

19. The optical pickup device as defined in claim 18, wherein said aberration information recording means records spherical aberration information in a predetermined area of said recording medium only when said recording medium is placed, after said detecting means detects a spherical aberration of said light-gathering optical system.

20. An aberration detector which divides a light beam passing through light-gathering optical system into plural areas in concentric circles, so as to detect spherical aberration in accordance with a focus position of only one of the plural areas of the light beam.

21. An optical pickup device which includes a light source and a light gathering means for gathering light, which is emitted from the light source, on a recording medium, comprising:
    a spherical aberration detector for dividing a light beam passing through light-gathering optical system into plural areas in concentric circles, so as to detect spherical aberration in accordance with a focus position of only one of the plural areas of the light beam.

22. The optical pickup device defined in claim 21, wherein a focus error is detected in accordance with a focus position of another area of the plural areas of the light beam.

23. The optical pickup device defined in claim 21, wherein said spherical aberration detector detects the spherical aberration in accordance with a focus position of a light beam passing through a periphery of the plural areas in the concentric circles.

24. The optical pickup device defined in claim 21, wherein a focus error signal is detected in accordance with a focus position of a light beam passing through a center of the plural areas in the concentric circles.

25. The optical pickup device defined in claim 21, comprising spherical aberration compensating means for compensating the spherical aberration, wherein
    said spherical aberration compensating means is driven so as to compensate the spherical aberration in accordance with a spherical aberration signal generated by said spherical aberration detector.

26. The optical pickup device defined in claim 25, wherein said spherical aberration compensating means adjusts a distance between two lenses included in the light-gathering optical system.

* * * * *